Oct. 4, 1927.

J. C. LEDBETTER 1,644,301

CABLE CONNECTER

Filed June 2, 1925

INVENTOR
James Camrod Ledbetter
BY

Bohleber Ledbetter
ATTORNEYS

Patented Oct. 4, 1927.

1,644,301

UNITED STATES PATENT OFFICE.

JAMES CAMROD LEDBETTER, OF NEW YORK, N. Y., ASSIGNOR TO THE THOMAS & BETTS CO., OF ELIZABETH, NEW JERSEY, A CORPORATION OF NEW JERSEY.

CABLE CONNECTER.

Application filed June 2, 1925. Serial No. 34,290.

This invention relates to cable connecters for use in securing cable to electric fixture boxes, outlet boxes and the like.

An object of the invention is to produce a cable connecter embodying improved bearing clamp plate means to protect the cable from the pressure of the cable clamp or screw operating means to the end that the considerable pressure as applied on the cable by the screw means will not open, spread or damage the wall of the cable; and the bearing clamp plate possesses improved means for attaching it to the connecter.

Among other things, an object is to produce a cable connecter in which the operating means, such as a screw or other device, may be used either inside the cable box or outside thereof and the screw wherever used acts to force a bearing plate against the cable to anchor the cable in the connecter, and also acts to simultaneously anchor the connecter to a box. The bearing clamp plate is so improved as to enable it to distribute and deliver pressure from the screw to the cable regardless of the position of the screw operating means.

An outstanding object of the invention is to produce a connecter so formed and constructed as to adapt it to fit into a box knockout or hole and leave a portion of said box hole edge exposed to the cable so that the cable overlies the exposed box hole edge and is pressed and embedded against the exposed box hole edge by the improved cable bearing clamp plate; and thus the single operating means which anchors the connecter in a box hole and grips a cable against an exposed box hole edge also drives the clamp plate against the cable.

With the above and further objects in view the invention has relation to an improved combination box and cable connecter and particularly relates to the connecter itself. The construction and mode of use may be varied in certain respects without departing from the principle of the invention, and the accompanying drawings illustrate one preferred form thereof.

Figure 1:
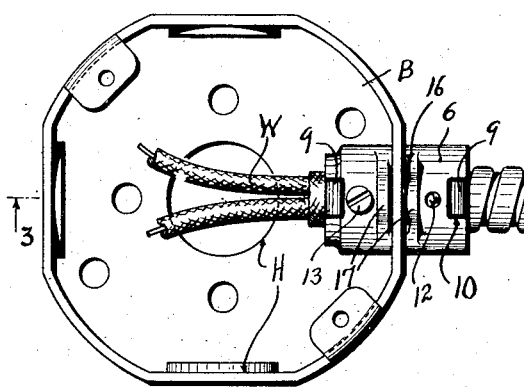
Figure 1 shows a plan view of a box with a cable anchored thereto by employing my improved connecter.
Figure 2:
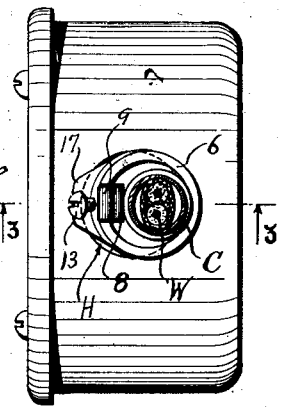
Figure 2 shows a side view looking at the outside end of the connecter in the box.
Figure 3:
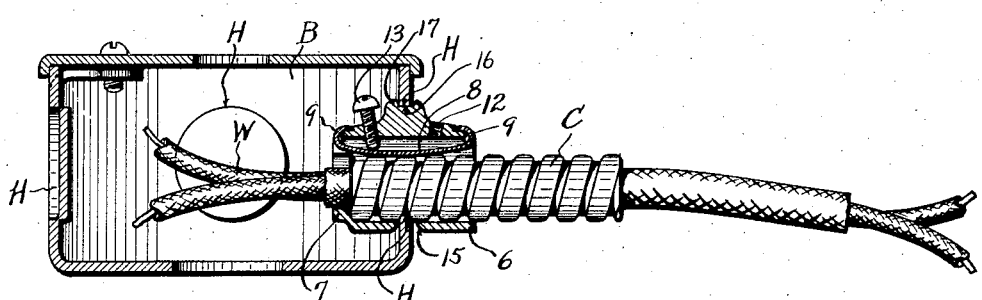
Figure 3 illustrates a sectional view taken on the line 3—3 showing an assembly in cross section.
Figure 4:
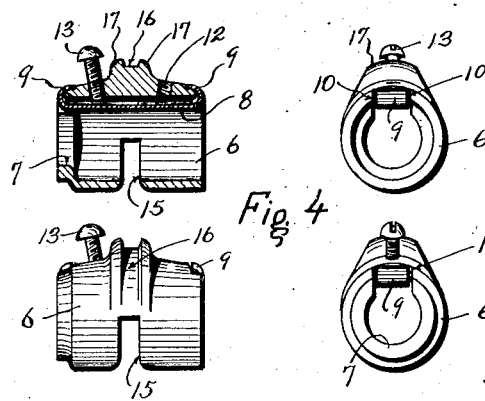
Figure 4 shows a cluster view of the connecter removed from the box.

Electrical fixture boxes B usually have knock-out openings H into which the cable C is inserted and anchored thereto by a connecter, and the cable wire W projects into the box where the electric connections are made.

Referring further to the drawings for a description first of the connecter, there is shown a cable receiving or embracing device such as a sleeve 6 open at both ends and one end may be provided with a shoulder bushing 7 if desired out through which the wires W pass. An important feature of the invention constitutes a straight bearing clamp plate 8 which extends from end to end of the sleeve and which has its extremities attached to the sleeve by any suitable means, as for example by curling its ends as at 9 whereby the extremities of the bearing clamp plate 8 loosely embrace or fit around the edge of each end of the sleeve so as to hold the clamp plate in position yet permit relative play as between it and the sleeve 6.

The curls 9 on one or both ends of the bearing clamp plate 8 rest within depressions 10 cast or stamped in the sleeve 6 and the plate 8 possesses slight relative freedom of motion so that it hangs freely in the sleeve and may shift upwardly out of the way of the cable end C when the cable is introduced thereinto. The means joining the sleeve and clamp plate together, such as the curls 9 which suspend the plate in the sleeve connecter 6, permit the clamp plate 8 to extend from end to end of the sleeve so that regardless of the position of the cable clamp operating means, such as a screw 13 whether it is placed at one end or the other end of the sleeve, said screw 13 bears on the bearing clamp plate and presses it against the cable C when the parts are assembled, and the plate protects the cable from the end of the screw.

The sleeve is preferably made with two tapped or threaded screw holes 12, each of which is placed toward the end of the sleeve, the object being to so dispose the two tapped screw holes 12 that one is located outside the box B and the other is located inside the box B when the parts are assembled. One clamp screw 13 is provided for both of the screw-threaded holes 12 since one screw is in fact usually sufficient to establish firm anchorage of all parts, and the mechanic making the installation may use the screw 13 in either position desired, inside or outside the box, the results being the same wherever used and the alternative positions making for convenience in assembling the parts.

Any suitable sleeve box hole anchorage means may be employed to anchor the sleeve connecter 6 in the box hole H, so in the present instance I have disclosed an exemplary sleeve anchorage means, intending that it be understood that other forms of box hole edge anchorages be used on connecters in conjunction with the bearing clamp plate improvements herein described. The sleeve box hole edge anchorage means herein disclosed and forming part of this improved combination functions so well with the cable clamp screw 13 and bearing clamp plate 8, that I employ it as an element in this connecter structure.

Describing now the exemplary sleeve and box anchorage means, a box wall entrant slot 15 is cast or stamped in the sleeve 6 and is adapted to eccentrically receive the wall of the box defining the hole H, the rim of the hole H, thereinto. In other words the wall of the box passes through the wall of the connecter sleeve 6 by emerging through the slot 15 into the sleeve which brings the edge or the rim of the box hole against the cable C since the cable C overlies the slot 15. A raised bearing face 16 flanked by ribs 17 is made on the connecter sleeve and rests against a portion of the box hole rim H with the said box hole rim disposed between the upstanding ribs 17. This relation of parts constitutes an interlocked joinder between the sleeve 6 and box B for the reason that a portion of the box hole rim H rests between the ribs 17 and an opposite portion thereof rests against the cable C inside the sleeve 6 which positively prevents longitudinal motion of the connecter 6 relatively to the box B and thus constitutes sleeve anchorage means for securing it to the box.

In assembling the parts, the cable clamp screw 13 is screwed back some distance so that the cable C easily slips into the connecter sleeve 6 with the wires W passing through the bushing 7. The cable and sleeve 6 are now thrust through or into the hole H of the box and the slot 15 and ribbed bearing face 16 set in position whereupon the screw 13 is tightened down against the bearing plate 8 thus exerting great pressure thereon which is directly applied to the cable C which in turn causes the cable to be jammed or pinched into the eccentric sharp edge H directly exposed to the cable C through the slot 15 within the box. The cable C overlies the box edge or rim H and the pressure of the screw 13 so firmly pinches the cable C into the box edge and so firmly seats the bearing face 16 up against the rim of the box opening that permanent and rigid anchorage of the sleeve in the box is the result.

The long bearing clamp plate 8 protects the cable C from being damaged by the end of the screw 13. The bearing clamp plate 8 also serves to equalize and distribute the pressure of the screw over the cable which is to say that the plate 8 prevents pressure of the screw being applied too much at one point only on the cable, serving particularly to transfer the pressure of the offset screw 13 directly over and in alignment with the plane of the box wall.

Inasmuch as the sleeve connecter 6 is provided with two tapped screw-threaded holes 12 it follows that the screw 13 may be used either inside or outside the box and therefore this connecter is useful from the standpoint of either old house work or new house work because it is the usual practice and more convenient to work on the inside of the box B in old house work and on the outside of the box for new house work.

The clamp screw 13 is offset from the center of the cable connecter 6 in order not to interfere in any way with the placing of the sleeve in the hole H which may be done from either side of the box wall since the sleeve 6 is sufficiently small to pass through the opening H in the box, and the screw 13 in either selected position cooperates with the bearing face 16 and wall entrant slot 15 for the purpose of fastening the cable in the sleeve and fastening the sleeve in the box at one and the same operation.

The slot 15 is representative of means forming a part of the design and structure of the connecter by which the connecter leaves exposed a portion of the box hole edge so that the overlying cable may be gripped between the connecter member and the exposed box hole edge. Other forms of sleeve or connecter structures may be resorted to for the purpose of leaving a portion of the box hole edge exposed direct to the cable. The sharp edge box hole or knock-out edge affords a most satisfactory and positive seat against which the cable is anchored and gripped between some part of the connecter and box edge. Furthermore, by gripping the cable against the box hole edge, the connecter itself is not called upon to perform wholly the fixing of the cable to the box.

The connecter preferably includes box hole edge anchorage means, i. e. a device or instrumentalities of suitable form, by which the connecter is anchored and fixed in the box hole and against or over the edge of said hole. An example of box hole edge anchorage means which functions satisfactorily is represented in the slot 15 which in effect constitutes spaced abutments to engage the inside and outside of the box wall adjacent the hole edge and thus anchor the connecter in the box against longitudinal displacement after movement of the screw is completed.

There is also further box hole anchorage means in the raised bearing face 16 and flanking ears or ribs 17 because the bearing face groove 16 is in alignment with the cut away portion defining the slot 15. Thus the box hole edge is received into this seating groove 16 and the ribs 17 anchor the connecter in the box hole because the spaced ears or ribs 17 are in effect space abutments performing a similar box anchoring function to that of the slot 15.

In fact the raised groove 16 receives a portion of the box hole edge and the cut away portion slot 15 receives another part thereof, so that the slot 15 and the ears 17 abut or engage the box hole edge inside and outside the box, and the ears 17 perform their function in this respect whether or not the slot 15 is employed or some equivalent thereof. The clamp operating means in the screw 13 driving down on the cable C produces a reaction which positively seats the raised bearing face groove 16 against the box hole edge, and the force of the screw grips the cable C against the other or opposite portion of the box hole edge.

What I claim is:

1. A cable connecter comprising, a sleeve for the reception of cable including box hole anchorage means, and formed to expose a portion of a box hole edge, a bearing clamp plate extending from end to end of the sleeve, means included on each end of the plate retaining said bearing clamp plate in the sleeve, and means carried on the sleeve to deliver pressure to the clamp plate to secure a cable in the sleeve and to render operative the box hole anchorage means.

2. A cable connecter comprising, a sleeve for the reception of cable, means to anchor the connecter in a box hole, a bearing clamp plate extending from end to end of the sleeve, means included on each end of the plate to retain it in the sleeve, and a screw carried on the sleeve adapted to drive against the clamp plate.

3. A cable connecter comprising, a sleeve, means to anchor the connecter in a box hole, a bearing clamp plate mounted in the sleeve, upturned portions formed on each end of the bearing clamp plate and curled around the sleeve ends by which it is retained in the sleeve, and means carried on the sleeve to drive against the clamp plate to anchor cable in the sleeve.

4. A cable connecter comprising, a member including box hole edge anchorage means, and formed to expose a portion of the box hole edge, a clamp plate mounted on the member and including end portions curled about the member ends to retain the clamp plate therein, and operating means carried on the member to exert pressure on the clamp plate to secure cable in a box hole and to operate the box hole edge anchorage means.

5. A cable connecter comprising, a member to receive cable, a cable clamp operating means carried on the member, a bearing clamp plate substantially equal in length to that of the member and so disposed that it is acted on by the clamp operating means to secure cable within the member, means forming a part of the structure of the member and clamp plate by which both ends of the clamp plate are attached to the member, and means carried on the member to anchor it in a box and operated by the clamp operating means.

6. A cable connecter comprising a member to receive a cable, a cable clamp operating means carried on the member, a cable bearing clamp plate substantially equal in length to that of the member and so disposed that it is acted on by the clamp operating means to anchor a cable within the member, said member made with a depression therein formed at each end, and each extremity of the plate being bent back into the depression and loosely attaching the plate to the member, and means carried on the member to anchor same in a box and operated by the aforesaid clamp operating means.

In testimony whereof I affix my signature.

JAMES CAMROD LEDBETTER.